No. 681,348. Patented Aug. 27, 1901.
T. SHIPLEY.
ICE MAKING APPARATUS.
(Application filed May 21, 1901.)
(No Model.) 3 Sheets—Sheet 1.
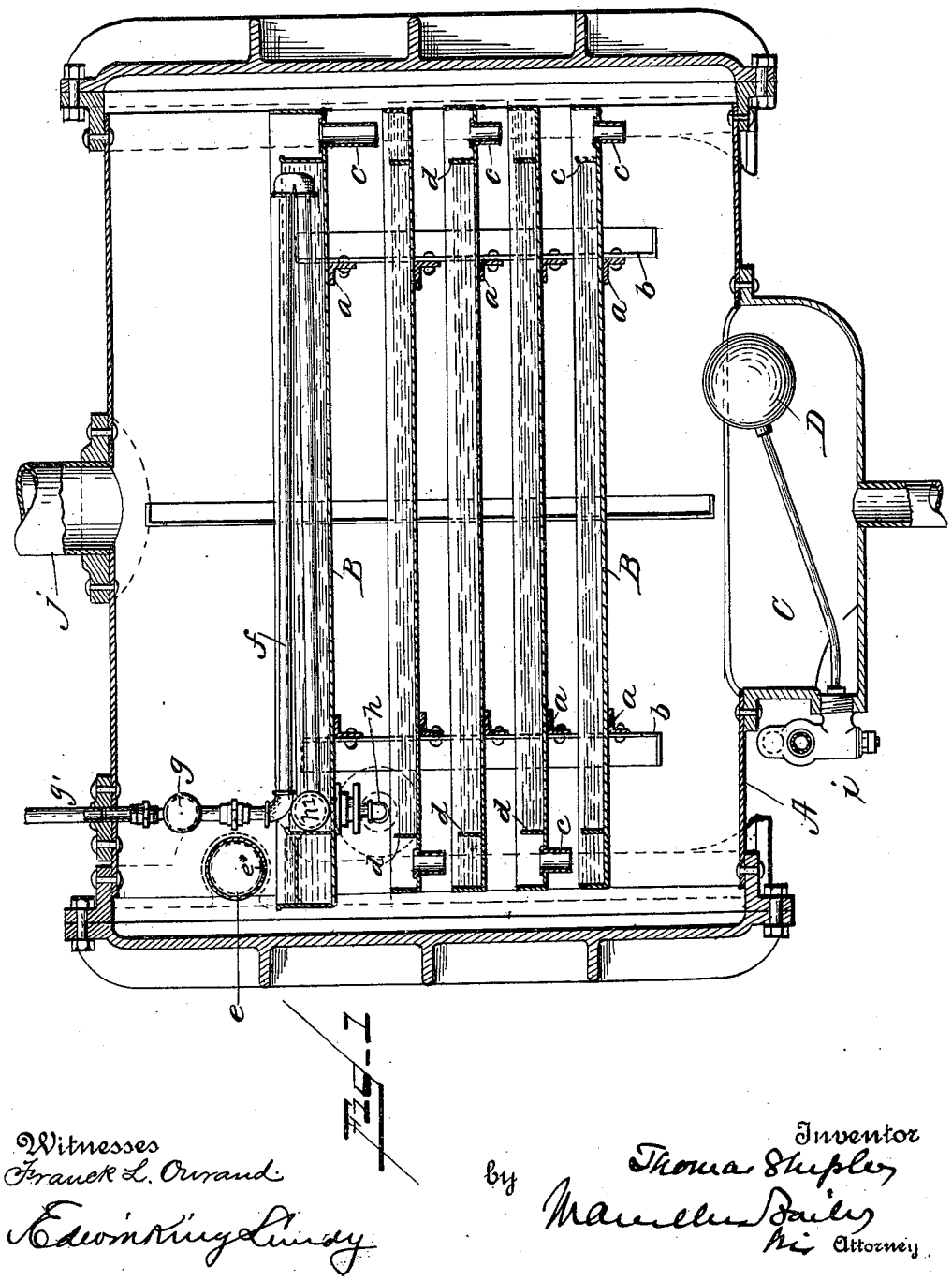

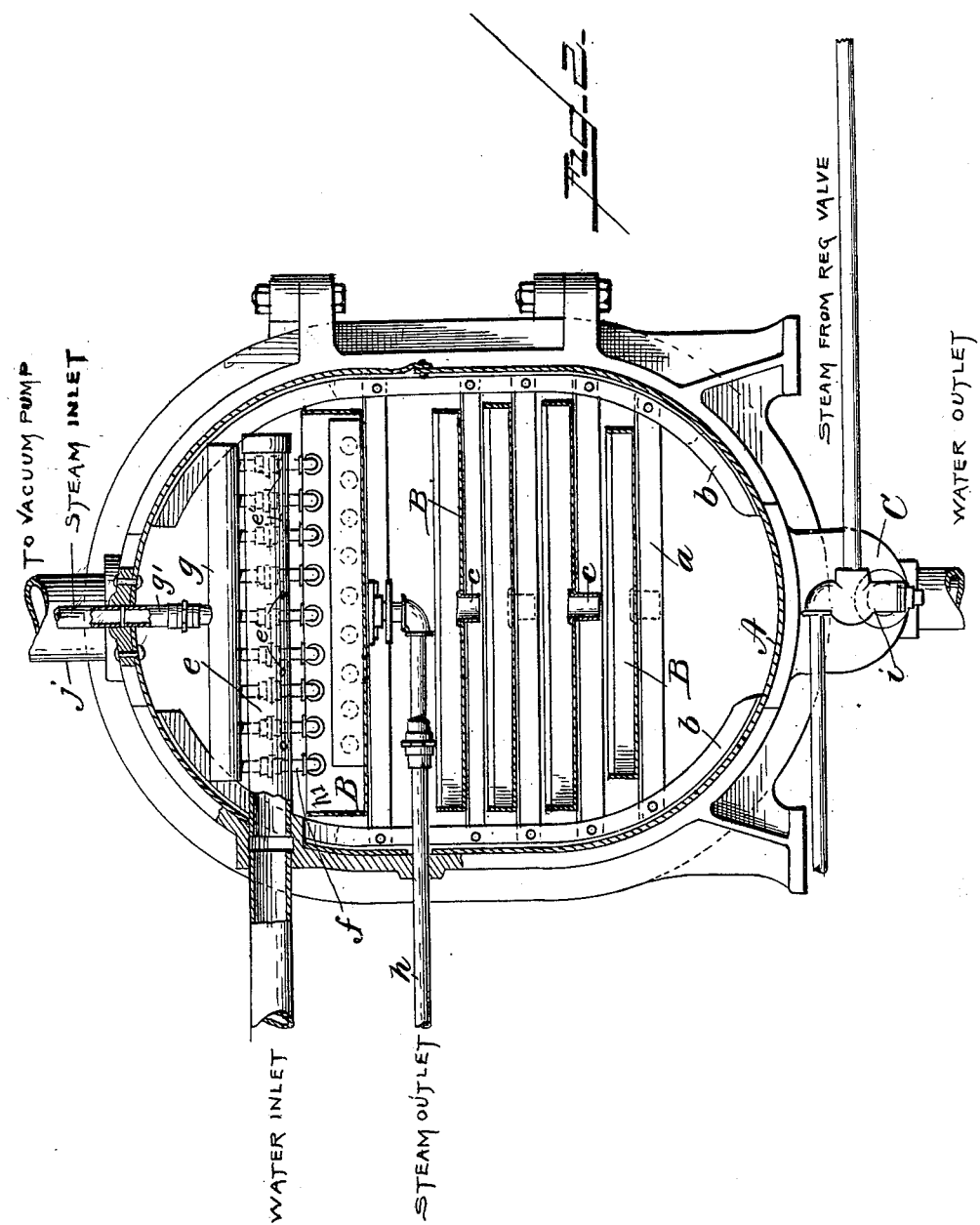

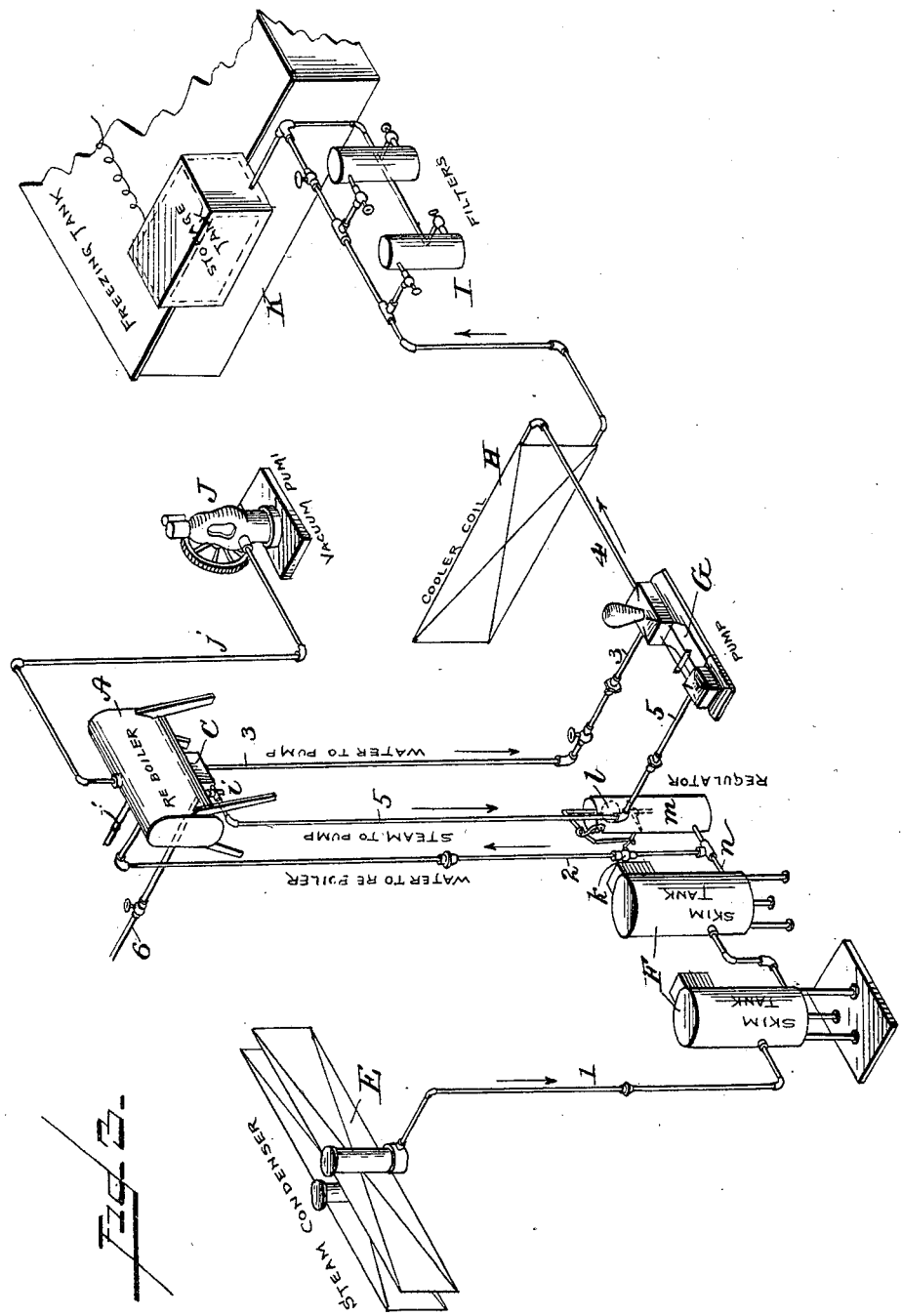

UNITED STATES PATENT OFFICE.

THOMAS SHIPLEY, OF YORK, PENNSYLVANIA.

ICE-MAKING APPARATUS.

SPECIFICATION forming part of Letters Patent No. 681,348, dated August 27, 1901.

Application filed May 21, 1901. Serial No. 61,238. (No model.)

*To all whom it may concern:*

Be it known that I, THOMAS SHIPLEY, a citizen of the United States, and a resident of York, in the county of York and State of Pennsylvania, have invented certain new and useful Improvements in Ice-Making Apparatus, of which the following is a specification.

My invention has to do with that part of an ice-making plant which is known as the "distilling apparatus," and the object of which is to furnish to the freezing-tank a supply of water properly prepared for ice-making purposes.

The distilling apparatus comprises a steam-condenser for the exhaust-steam, settling or "skim" tanks for the water of condensation, a "reboiler" in which the water from said tanks is boiled, so as to deaerate and purify it, and a pump which takes the water from the reboiler and forces it successively through cooling and filtering devices, from which it is finally delivered into a storage-tank. My improvements relate to the reboiler and the parts more immediately associated with the same.

I shall first describe, in connection with the accompanying drawings, forming part of this specification, an apparatus embodying my improvements in their preferred form and will then point out in the claims those features of the same which I believe to be new and of my own invention.

In said drawings, Figure 1 is a longitudinal vertical central section of the reboiler. Fig. 2 is an end elevation of the same, partly in section, with the head of the boiler removed, so as to expose to view the parts within. Fig. 3 is a representation, mainly diagrammatic, of the complete distilling apparatus, showing the system of piping and devices for automatically regulating the supply of water to the reboiler and the drawing off of water from the reboiler.

The shell A of the reboiler is closed and air-tight. It contains a series of shallow superposed pans B, supported on metallic cross-pieces $a$, made, preferably, of angle-iron, which at their ends are riveted or otherwise secured to ribs $b$, (of the same angle-iron form,) secured to the walls of the shell. Each pan is provided with an overflow-pipe $c$ and with dams $d$ to maintain the required depth of water in the pan. The water drops from one pan to the other through the overflows $c$ and circulates through each pan. It is supplied to the reboiler from a suitable inlet-pipe which enters a header $e$ within the shell arranged over the topmost pan B and perforated at $e'$ to permit the water to escape from it into said pan. In one or more of these pans—preferably the top pan, which for this purpose is made deeper than the others—I place steam-pipes $f$, which extend back and forth over the floor or bottom of the pans, communicating at one end with a steam-header $g$, to which steam from a suitable source is supplied from an inlet $g'$, and at the other end with a steam-outlet $h\ h'$. The bottom of the shell of the reboiler is made with a float-tank C, containing a float D, connected with and adapted to automatically operate a valve (contained in valve-casing $i$) controlling the supply of steam to the pump (hereinafter referred to) for drawing off the boiled water from the reboiler, and thereby regulating the speed of the pump.

The reboiler through a suitable connection $j$ is in communication with a vacuum-pump (shown in Fig. 3) which is in continuous operation during the working of the apparatus. It not only withdraws the gases from the reboiler, but it also serves to create and maintain a partial vacuum therein. The beneficial effect of this is twofold over reboilers in which the water is boiled at atmospheric pressure: First, the water has a lower boiling-point, and therefore less heat is required to bring it to the boiling-point, and, secondly, the temperature of the water leaving the reboiler is very much less—say not above 140° Fahrenheit. The resulting advantages of this latter will be understood when it is considered that it is from this point that the water which is to be made into ice must be cooled by the apparatus in general, and consequently the lower its temperature on leaving the reboiler the less will be the labor and cost of subsequently cooling it.

Referring now to Fig. 3, the water from the condenser E through pipe 1 passes to the condense-water reservoir, consisting of the skim-tanks T, thence through pipe 2 to the reboiler A, thence by pipe 3 to pump G, and thence by suitable piping 4 to the cooler H, filter I, and storage-tank K. Steam is supplied to the pump from pipe 5, in which is the valve-casing $i$, Figs. 1 and 2, containing the steam-regulating valve connected to and automatically operated by the float D in the tank C, as hereinbefore described. The automatic regulation of the supply of water to the reboiler is effected by providing the pipe 2 with a valve $k$, connected to and controlled by a float $l$ in a regulator-tank $m$, which receives its supply of water from one of the skim-tanks through a pipe $n$. The rise and fall of the float in the regulator-tank $m$ (due to variation in the water-level therein) will, through the connections operated by the float, correspondingly close and open the valve $k$, thus automatically regulating the supply of water to the reboiler.

The vacuum-pump is shown at J, connected to the reboiler by pipe $j$. By reason of the vacuum or partial vacuum thus produced the water is drawn from the skim-tanks into the reboiler. In lieu of the pump other suitable known means of creating and maintaining a vacuum can be employed.

Having now described my improvements and the best way of carrying the same into effect, what I claim herein, and desire to secure by Letters Patent, is—

1. The combination of the reboiler; connections between said reboiler and a source of water-supply, and means whereby the water-supply is caused to circulate in thin layers within the reboiler; a steam-heater within the reboiler, arranged to have contact with the circulating water; means for creating and maintaining a vacuum in the reboiler; a draw-off pump connected to the water-outlet of the reboiler and means for automatically regulating the speed of the draw-off pump and the feed of water to the reboiler, substantially as hereinbefore set forth.

2. The reboiler provided with a series of superposed shallow pans from one to the other of which the entering water passes, an inlet for water-supply, a steam-coil located in one of the pans and means for supplying steam thereto, in combination with means for creating and maintaining a vacuum in said reboiler, a draw-off pump connected to the water-outlet of the reboiler and means for automatically regulating the speed of the draw-off pump, substantially as and for the purposes hereinbefore set forth.

3. In a distilling apparatus for ice-making machinery, the combination of the condenser; the condense-water reservoir; the reboiler connected to said reservoir and provided with a series of shallow circulating-pans; means for creating and maintaining a vacuum in the reboiler; means for automatically regulating the speed of the draw-off pump controlled by the water at the outlet end of the reboiler; and means for automatically regulating the feed of water to the reboiler, located outside of the reboiler and between it and the condense-water reservoir, as and for the purposes hereinbefore set forth.

In testimony whereof I have hereunto set my hand this 15th day of May, 1901.

THOMAS SHIPLEY.

Witnesses:
A. B. STRICKLER,
M. W. SMITH.